April 14, 1936.  H. A. CHUBBUCK  2,037,118

AUTOMOBILE GENERATOR REGULATOR

Filed Dec. 24, 1934

INVENTOR.
H. A. Chubbuck
BY
ATTORNEY.

Patented Apr. 14, 1936

2,037,118

UNITED STATES PATENT OFFICE 2,037,118

AUTOMOBILE GENERATOR REGULATOR

Horace A. Chubbuck, Dearborn, Mich., assignor to Ford Motor Company, Dearborn, Mich., a corporation of Delaware Application December 24, 1934, Serial No. 758,929

8 Claims. (Cl. 171—313)

The object of my invention is to provide an automobile generator regulator which, when used in combination with a conventional third-brush regulated generator, will maintain the output voltage of the generator at a potential equivalent to the maximum safe charging rate of the battery at the ambient temperature of the battery, and, of course, within the limits of the generator. My device operates in a manner similar to conventional regulators in that a resistance is inserted in the field circuit of the generator when it is desired to reduce the output of the generator. The voltage at which this resistance is inserted varies according to the ambient temperature of the battery so that the generator may operate at its maximum rate until the battery is fully charged. A predetermined output voltage causes the opening of a pair of contact points which are in series with the field winding of the generator and across which is shunted a resistance to thereby reduce the output voltage of the generator to only that required to operate the fixed load of the vehicle. Temperature responsive means are provided, as in some conventional regulators, whereby the voltage at which the resistance is inserted varies according to the temperature of the regulator for the reason that, when the battery is cold, a much higher voltage is required to fully charge same than is required when the battery is warm. However, this desired voltage does not increase in direct proportion to the drop in temperature of the battery, but on the contrary a greater increase in voltage per degree of drop is required at the lower temperatures than at high temperatures. For this reason, the conventional bi-metal thermostatic compensator is not entirely satisfactory. It is, therefore, the purpose of this invention to provide a thermostatically operated means which will compensate for temperature changes over the full operating range of the vehicle. My regulator differs from the conventional type of regulator in that two rates of compensation are provided, one for temperatures below 70 degrees Fahrenheit and the other for temperatures above 70 degrees Fahrenheit.

Still a further object of my invention is to provide means whereby the voltage regulator is rendered inoperative to reduce the charging rate of the generator during the period when the vehicle engine is being warmed up. Inasmuch as my regulator is operated by the ambient temperature of the device, it is important that the regulator be inoperative until it has attained its normal operating temperature. Provision is made, nevertheless, whereby an excessively high charging voltage, such as might burn out the filaments in the light bulbs, is prevented even though the device has not reached its normal operating temperature.

With these and other objects in view, my invention consists in the arrangement, construction and combination of the various parts of my improved device, as described in the specification, claimed in my claims, and illustrated in the accompanying drawing, in which:

My improved regulator is mounted together with a cut-out upon a base plate 32, the whole unit being enclosed within a housing 33 which is adapted to be fixed upon the generator of the vehicle engine.

Figures 1, 3:
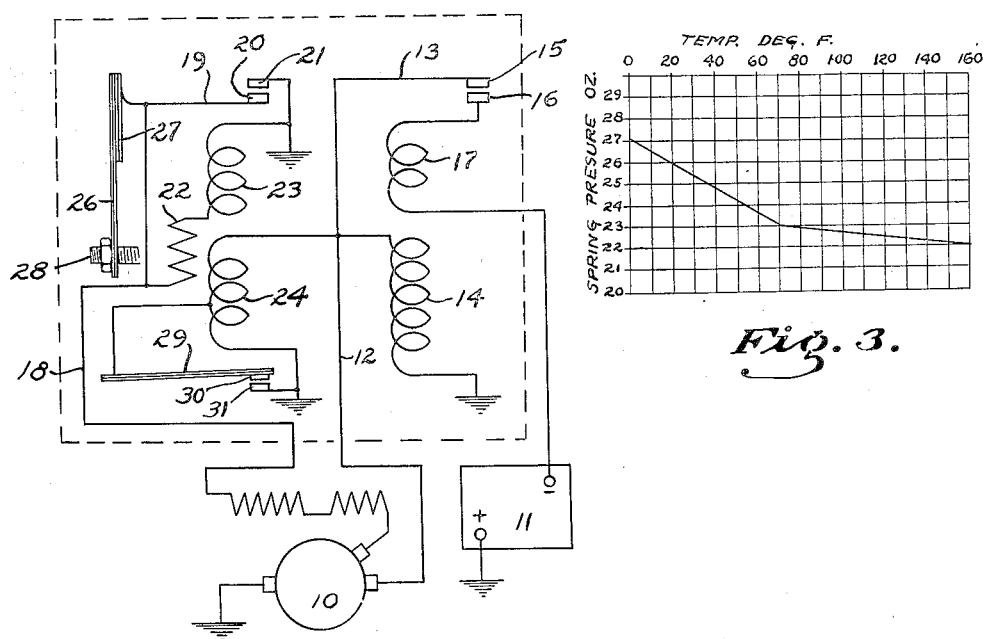
Figure 1 is a diagrammatic wiring diagram of a conventional vehicle battery, generator and cutout in combination with my improved regulating device.
Figure 3 is a chart showing the effective spring pressures on the regulator armature for the various operating temperatures of the device.

Referring to the accompanying drawing, particularly Figure 1, it will be noted that I have provided a generator 10 which has the conventional third-brush type of regulation. A storage battery 11 is provided, the positive terminal of which is grounded to the vehicle frame, as is one terminal of the generator 10. The output terminal of the generator is connected by means of a lead 12 with an armature 13 of a cut-out unit and also with one end of a high resistance cut-out winding 14. The other end of the winding 14 is grounded so that upon the output voltage of the generator increasing above 6½ volts, there is sufficient flux generated to draw the armature 13 downwardly. A pair of cut-out points 15 and 16 are secured respectively to the armature 13 and to a stationary bracket, the stationary point 16 being connected to one terminal of a low resistance winding 17. The other end of the winding 17 is connected to the negative pole of the battery 11. Consequently when the generator voltage reaches approximately 6½ volts the contact points 15 and 16 close thereby conducting the output current of the generator through the winding 17 which holds the armature in its downward position to thereby connect the generator and the battery in a conventional manner.

The foregoing elements have been described solely to bring out the operation of my device; however, they form no part of my invention.

The third brush of the generator is connected to one end of the generator field winding while the other end of this field winding is connected through a wire 18 with the armature 19 of my regulator. A contact point 20 is fixed to the free end of the armature 19, this point coacting with a stationary point 21 which is grounded. I have provided a fixed resistance 22 which is connected in series with an inductive resistance 23, the latter being wound around the core of my regulator, which two resistances are shunted across the contact points 20 and 21. Consequently, when the contact points are open the resistances 22 and 23 are in series with the field winding of the generator and inversely, when the contact points are closed, the field winding of the generator is directly grounded.

I have provided a regulator winding 24, one end of which is grounded and the other end of which is connected to the wire 12 from the generator so that the flux produced by the winding 24 tends to pull the armature 19 downwardly and open the contact points 20 and 21. The purpose of providing part of the field circuit resistance as inductive resistance is that upon the opening of the contact points the generator voltage drops slightly and causes less torque to be produced by the winding 24. This reduction in torque is offset by the added flux of the resistance 23 so that fluttering of the points is prevented.

Figure 2:
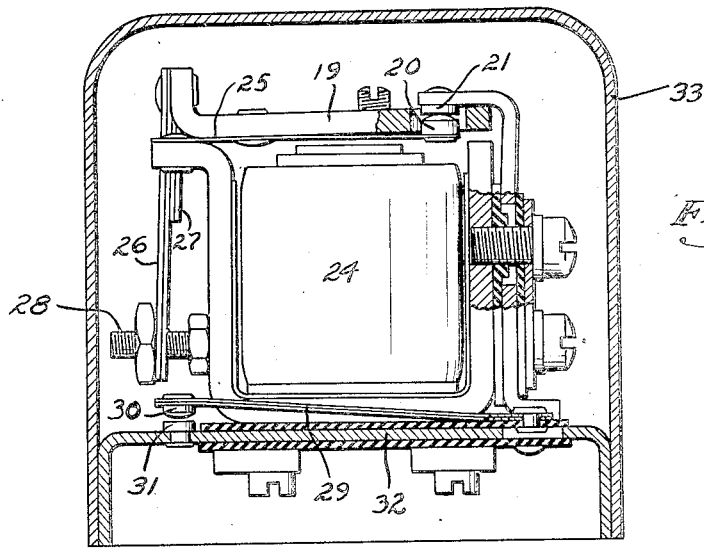
Figure 2 is a side view of my improved regulator, showing the arrangement of the thermostatically operated controls.

It will be noted from Figure 2 that the armature 19 is hinged by a leaf hinge 25 and that a pair of bi-metal springs 26 and 27, respectively, extend from the hinged end of the armature downwardly towards an adjusting screw 28. The spring 27 extends from the armature about halfway down to the screw while the spring 26 extends all the way to the screw and coacts with adjusting nut thereon. The springs are both composed of invar and brass and are placed with the invar sides of the springs abutting each other. Thus, upon an increase in temperature the springs tend to deflect towards each other and thereby neutralize the movement of the springs over their abutting length. The springs 26 and 27 urge the armature 19 upwardly so as to close the contact points 20 and 21 and consequently, variation in the curvature of these springs varies the spring pressure on the armature. The voltage at which the generator is reduced is thus regulated by the spring pressure on the armature which is the resultant of the two opposed springs. The springs are formed so that at 70 degrees Fahrenheit both are flat. When the temperature drops below 70 degrees Fahrenheit, the free end of the spring 27 tends to deflect towards the right while the free end of the spring 26 tends to deflect towards the left so that at such temperatures the movement of these springs is independent of each other. Consequently, an increase in spring pressure occurs due to the lowering of temperature, this increase being governed by the deflection of the full length of the spring 26 independently of the spring 27.

When the temperature increases above 70 degrees Fahrenheit, the springs 26 and 27 deflect towards each other so that those portions of the springs which overlap neutralize each other. It is only that portion of the spring 26 between the outer end of the spring 27 and the adjusting screw 28 which is effective to vary the pressure at temperature changes above 70 degrees Fahrenheit. For this reason a much reduced change in spring pressure results for each degree of temperature variation above 70 degrees Fahrenheit than occurs below 70 degrees Fahrenheit.

From the chart shown in Figure 3, it will be seen that the rate of spring pressure increase from 70 to 0 degrees Fahrenheit is considerably greater than the rate above 70 degrees Fahrenheit, the former being produced by the spring 26 alone, while the latter is produced by the differential action on the springs 26 and 27. The resultant effective spring pressures upon the armature 19 thus more closely approach the spring pressures required to maintain the battery in a fully charged condition at all operating temperatures.

Inasmuch as the action of the regulator depends upon the temperature of the springs 26 and 27 and inasmuch as these springs are located at the generator which is mounted upon the motor, it is quite essential that regulation be dispensed with until the device assumes it normal operating temperature. In order to accomplish this I have provided a bi-metal strip 29 having one end connected to a tap on the regulator winding 24 which is taken off from a turn about a quarter of the distance from the grounded end of the regulator winding. The free end of the bi-metal strip is provided with a contact point 30 which coacts with a stationary grounded point 31, the whole unit being mounted within the regulator housing 33. The strip 29 is so mounted that an increase in temperature tends to open the contact points 30 and 31; however, sufficient tension is provided to prevent opening of these points until a temperature of about 50 degrees Fahrenheit is reached. This point is not critical. Thus, when the generator starts up from cold the flux from only about three-quarters of the regulator winding 24 tends to open the contact points 20 and 21. The full charging rate of the generator is thereby produced irrespective of the condition of the battery. When the regulator reaches its normal operating temperature the points 30 and 31 open to thereby allow the full winding 24 to come into play so that the springs 26 and 27 then regulate the device according to the ambient temperature of the regulator. However, an excessively high generator voltage will produce sufficient flux even with only three-quarters of the winding 24 to open the points 20 and 21. The lamp filaments are thus protected against such voltages as might cause their failure.

In operation, the generator when started almost instantly builds up sufficient voltage to close the points 15 and 16 and inasmuch as the contact points 30 and 31 are at this time closed, the armature 19 is still retained in its upward position so that the full output current of the generator is produced. After about five minutes of operation, the strip 29 warms up to its normal operating temperature so that, if at this time the battery is fully charged, then sufficient current will be generated in the winding 24 to move the armature 19, thereby placing the resistances 22 and 23 in the field circuit of the generator.

Among the many advantages arising from the use of my improved device, it may be well to mention that I have provided means for altering the effective armature spring pressure at one rate for temperature variations below 70 degrees Fahrenheit and at a different rate for the temperature variations above 70 degrees Fahrenheit. In this way improved regulation is obtained which more closely approaches the theoretical requirements for perfect regulation.

Still further, the means whereby the regulation is rendered inoperative until it has attained its normal operating temperature insures that correct regulation will be provided whenever the device is operating.

Some changes may be made in the arrangement, combination and construction of the several parts comprising my improved device without departing from the spirit of my invention, and it is my intention to cover by my claims such changes as may reasonably be included within the scope thereof.

I claim as my invention:

1. In a regulator adapted to reduce the output current of a generator upon the voltage of said current reaching a predetermined value comprising, means for increasing said predetermined value at one rate for ambient temperature reductions within one temperature range, and a second means for increasing said predetermined value at a different rate for ambient temperature reductions within a second temperature range.

2. In a regulator adapted to reduce the output current of a generator upon the voltage of said current reaching a predetermined value comprising, means for increasing said predetermined value at one rate for ambient temperature reductions occurring below 70 degrees Fahrenheit, and a second means for increasing said predetermined value at a lesser rate for ambient temperature reductions occurring above 70 degrees Fahrenheit.

3. In a regulator adapted to reduce the output current of a generator upon the voltage of said current reaching a predetermined value comprising, temperature responsive means for uniformly varying said predetermined value at one rate for ambient temperature changes over the full operating range of the regulator, and a second temperature responsive means arranged to counteract said first mentioned means over a portion of the operating range, whereby a resultant rate differing from the first mentioned rate will be produced over said portion of the temperature range.

4. A device, as claimed in claim 3, wherein both of said temperature responsive means comprise, respectively, bi-metal elements having differing effective lengths.

5. A device, as claimed in claim 3, wherein both of said temperature responsive means comprise, respectively, bi-metal elements having differing effective lengths with the sides having the low expansion coefficients arranged back to back, for the purpose described.

6. A regulator adapted to reduce the output current of a generator upon the voltage of said current reaching a predetermined value comprising, an armature, a resistance in the field circuit of the generator, contact points actuated by said armature and arranged to operatively short-circuit said resistance, a regulator winding energized responsive to the voltage of the generator, a spring associated with said armature tending to close said points, means for increasing said spring pressure at one rate for ambient temperature reductions within a range of low temperatures, and means for increasing said spring pressure at a different rate for ambient temperature reductions within a range of higher temperatures.

7. A device, as claimed in claim 6, wherein said spring and both of said spring pressure increasing means comprise a pair of bi-metal members, one of which extends from the armature to an adjusting screw on the regulator.

8. A device, as claimed in claim 6, wherein said low temperature range extends from 70 degrees Fahrenheit downwardly, and wherein said higher temperature range extends from 70 degrees Fahrenheit upwardly.

HORACE A. CHUBBUCK.